US008714586B2

(12) United States Patent
Wilmot et al.

(10) Patent No.: US 8,714,586 B2
(45) Date of Patent: May 6, 2014

(54) OCCUPANT PROTECTION DEVICE

(71) Applicant: TK Holdings Inc., Auburn Hills, MI (US)

(72) Inventors: Larry M. Wilmot, Oxford, MI (US); Paresh Khandhadia, Troy, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 13/866,392

(22) Filed: Apr. 19, 2013

(65) Prior Publication Data

US 2013/0276661 A1      Oct. 24, 2013

Related U.S. Application Data

(60) Provisional application No. 61/636,383, filed on Apr. 20, 2012.

(51) Int. Cl.
 *B60R 21/16*     (2006.01)

(52) U.S. Cl.
 USPC ........................................ 280/730.1; 280/735

(58) Field of Classification Search
 USPC ................................. 280/730.1, 735, 734, 741
 See application file for complete search history.

(56) References Cited

U.S. PATENT DOCUMENTS

| 5,160,164 | A  |   | 11/1992 | Fischer et al. |
|-----------|----|---|---------|----------------|
| 6,540,041 | B2 | * | 4/2003  | Feldman ............ 180/271 |
| 6,682,141 | B2 | * | 1/2004  | Reynolds et al. ...... 297/216.1 |
| 2002/0148667 | A1 |   | 10/2002 | Feldman |
| 2004/0113399 | A1 |   | 6/2004  | Yoshikawa et al. |
| 2004/0195029 | A1 |   | 10/2004 | Feldman |

FOREIGN PATENT DOCUMENTS

JP     09-169205     6/1997

OTHER PUBLICATIONS

U.S. Appl. No. 13/830,443, filed Mar. 14, 2013, Jialou Hu et al.
International Search Report dated Jul. 25, 2013 issued in connection with International Application No. PCT/US2013/037349.
Written Opinion dated Jul. 25, 2013 issued in connection with International Application No. PCT/US2013/037349.

* cited by examiner

*Primary Examiner* — Faye M. Fleming
(74) *Attorney, Agent, or Firm* — Foley & Lardner LLP

(57) ABSTRACT

A system for protecting an occupant positioned in a seat of a vehicle. The system includes a gas emitting device positioned adjacent to an occupant of a vehicle. The system also may include a controller configured to control the activation of the gas emitting device. A sensor configured to detect the vertical acceleration of the vehicle, may be included. The controller may be configured to receive a signal from the sensor and activate the gas emitting device when the signal from the sensor is indicative of a condition where the vertical acceleration of the vehicle exceeds a predetermined threshold. When activated, the gas emitting device may be configured to emit gas toward the legs of the occupant so that the force of the emitted gas directly forces the legs of the occupant to move.

17 Claims, 2 Drawing Sheets

OCCUPANT PROTECTION DEVICE

CROSS-REFERENCE TO RELATED PATENT APPLICATIONS

This application claims priority to and the benefit of U.S. Provisional Patent Application No. 61/636,383, filed Apr. 20, 2012. The foregoing provisional patent application is incorporated herein by reference in its entirety.

BACKGROUND

The present application relates generally to the field of devices configured to protect an occupant of a vehicle. More specifically, the present application relates to an occupant protection device configured for use in armored vehicles, including military vehicles.

Conventional restraint systems are used to restrain an occupant, for example, a vehicle occupant, within a vehicle seat during normal operation of the vehicle, and also during vehicle emergencies, such as a vehicle collision. In order to provide further protection to a vehicle occupant, conventional restraint systems may be designed to absorb some of the force that is generated from a collision. For example, a restraint system may include various devices such as pretensioners and seat belt webbing to absorb force generated during a collision.

Current safety systems do not detect significant vertical acceleration. Nor do these systems adequately protect an occupant from extreme vertical acceleration (such as, for example, caused by a detonation of an explosive device under a vehicle). Nor do these systems protect an occupant from typical events that follow as an effect of an extreme vertical acceleration. It would be advantageous to provide an improved occupant protection system that addresses one or more of the aforementioned issues.

SUMMARY

According to an embodiment disclosed herein a system for protecting an occupant positioned in a seat of a vehicle is provided. The system includes a gas emitting device positioned adjacent to an occupant of a vehicle, a controller configured to control the activation of the gas emitting device. The gas emitting device is configured to emit gas toward a portion of the occupant so that the force of the emitted gas directly forces the portion of the occupant to move. The system may also include a sensor for detecting a vertical acceleration of the vehicle. The controller may be configured to activate the gas emitting device when the vertical acceleration exceeds a predetermined threshold.

The gas emitting device may be located under the seat and may include a gas directing device that directs the emitted gas toward the legs of the occupant. The gas emitting device may include a pyrotechnic gas generator. Alternatively, the gas emitting device may include stored gas or stored gas in combination with a pyrotechnic gas generator.

According to another embodiment, a module for protecting the legs of an occupant positioned in a seat of a vehicle from an explosive force originating under a floor of the vehicle is provided. The module includes a gas emitting device that is configured to emit gas in the direction of the vehicle occupant so that the legs of the occupant are forced to move by the emitted gas impinging directly on the legs. The module may be positioned below the seat of the vehicle and includes a gas directing device configured to direct the emitted gas toward to the legs of the occupant. The gas emitting device may be configured to be activated by a signal from a controller. The module includes a housing for directing the emitted gas toward the legs of the occupant.

According to another disclosed embodiment, a system for protecting an occupant positioned in a seat of a vehicle is provided that includes a gas emitting device positioned adjacent to an occupant of a vehicle and a controller configured to control the activation of the gas emitting device. The system further includes a sensor configured to detect the vertical acceleration of the vehicle. The controller is configured to receive a signal from the sensor and activate the gas emitting device when the signal from the sensor is indicative of a condition where the vertical acceleration of the vehicle exceeds a predetermined threshold. When activated, the gas emitting device is configured to emit gas toward the legs of the occupant so that the force of the emitted gas directly forces the legs of the occupant to move.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

With general references to the Figures, disclosed herein is an occupant protection system for use in vehicles, including armored vehicles, particularly military vehicles, that are configured to protect occupants of the vehicle during external explosions of the vehicle, and in particular external explosions taking place under the vehicle, such as an undercarriage mine explosion. The occupant protection devices include a gas generator configured to produce gas (e.g., supersonic gas), which is then directed onto a portion of the occupant, such as the lower legs, to move the portion of the occupant to a relatively safer location. Moving the feet and legs of the occupant away from the floor of the vehicle greatly reduces the force applied to the body (including, for example, the force applied to the spine of the occupant) when the vehicle is subject to a sharp spike in vertical acceleration due to the force of the explosion under the vehicle. During an explosion under a vehicle, significant loads may be transmitted to the occupant through structural components such as the vehicle floor and/or seat. Thus, removing the occupant (i.e., the feet and legs of the occupant) from contact with the floor of the vehicle may reduce the impulse loading on the occupant.

Figure 1:
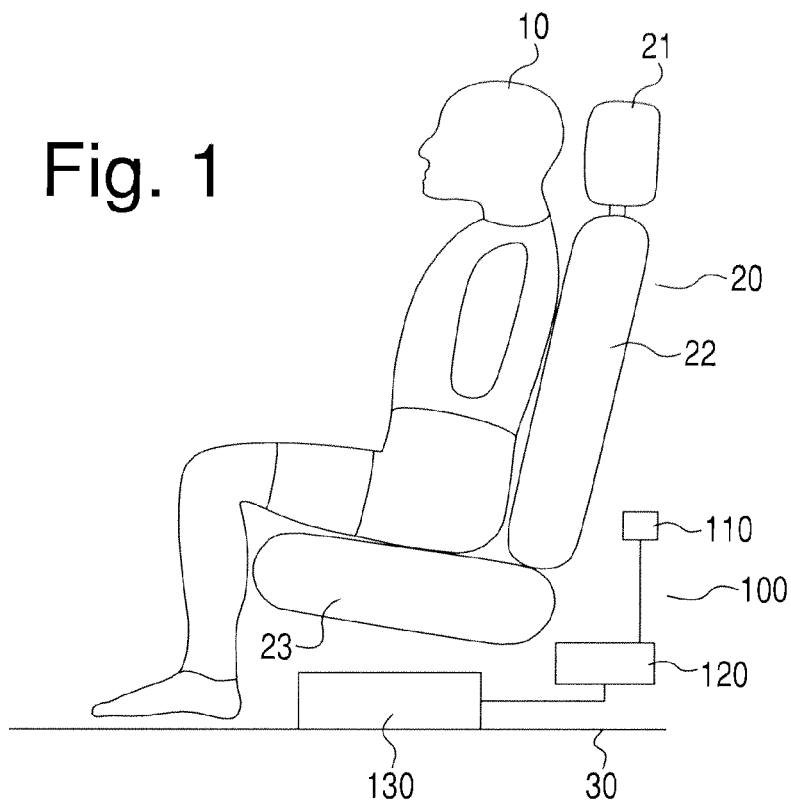
FIG. 1 is a side view of a seated occupant of a vehicle having an exemplary embodiment of an occupant protection system shown prior to activation.

FIG. 1 illustrates an exemplary embodiment of an interior of a vehicle, such as a military vehicle, having a seat system 20 configured to provide seating to an occupant 10 of the vehicle. The seat system 20 includes a head rest 21, a seat back portion 22, and a seat bottom 23. The vehicle also includes an occupant protection system 100 configured to protect the seated occupant 10 by moving a portion of the occupant, such as the limbs, from a relatively less safe location to a relatively more safe location.

The occupant protection device 100 may be located anywhere in the vehicle, such as being located proximate to the portion of the occupant that is being protected. The occupant protection system 100 includes a gas emitting device or module 130, which may be mounted to the floor 30 of the vehicle below the seat system 20. This location may be advantageous for protecting the legs of the occupant, due in part to the being located proximate to the lower legs of the occupant, such that upon activation, the emitted gas may move the legs in less time relative to other systems. For example, the gas emitting device 130 may be mounted to the seat system 20.

The gas emitting device 130 may include a housing 131 and a gas generator 132 or inflator. The housing 131 may provide structural support to the gas generator 132, such as by supporting the gas generator 132 during activation, where high stresses may be induced. The gas emitting device 130 may include a diffuser or gas directing device 133 for directing the emitted gas toward the occupant. According to one embodiment the diffuser or gas directing device 133 may be integrated into the housing 131 and/or the gas generator 132. The gas emitting device 130 may have any suitable configuration, which may be tailored to the vehicle that the occupant protection system is being used within.

The gas emitting device 130 is configured to produce gas, such as supersonic gas, under a relatively high pressure in a relatively short period of time. The gas generator 132 may be any suitable gas producing apparatus, such as, for example, a pyrotechnic device or a stored gas device. The gas (e.g., the high pressure gas) generated by the gas generator 132 is used to move the portion of the occupant, so the pressure of the gas may be tailored to move the limbs of relatively small occupants (e.g., $5^{th}$ percentile occupants, $50^{th}$ percentile occupants) without causing injury while still moving the limbs of relatively large occupants ($95^{th}$ percentile) with relative ease. The gas may be gentler on human bones and joints than mechanical masses would be.

Figure 3:
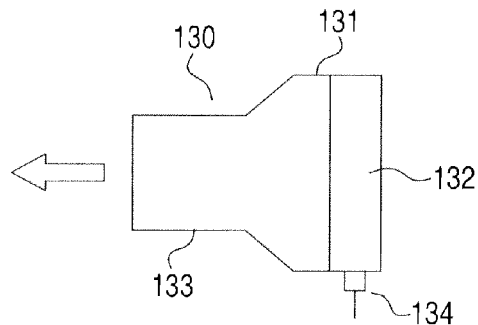
FIG. 3 is a top view of an exemplary embodiment of a gas emitting device.
Figure 4:
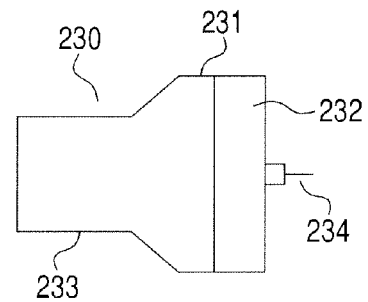
FIG. 4 is a top view of an exemplary embodiment of a gas emitting device.

As shown for example in FIGS. 3 and 4, the gas emitting device may employ any number of suitable types of gas generators. For example, as shown in FIG. 3 a cylindrically shaped gas generator may be used 132. The gas generator 132 may be a pyrotechnic type gas generator or a stored gas type gas generator. When a signal is received from the controller by the gas generator at an appropriate electrical input 134, the gas is released in the direction of the occupant. A pyrotechnic type gas generator may include an igniter for receiving the signal from the controller and starting the gas generating process. In the case of a stored gas inflator, the signal from the controller may cause the opening of a solenoid type valve or a rupture of a seal to release the stored gas. Gas may be directed by the shape of the gas directing device or diffuser, which may be integrated into the housing of the gas emitting device. The gas generator 132 may include a separate enclosure that includes ports or openings designed to direct or diffuse the gas in the desired direction. For example, when a cylindrically shaped gas generator is employed a series of ports or openings may be provided on the side of the gas generator facing the occupant.

Further by way of example, as shown in the gas emitting device 230 of FIG. 4, a disc shaped gas generator 232 may be used. The shape of the housing 231 and gas directing device 232 is configured to match the shape of the gas generator 232.

As explained above with regard to FIG. 3, the gas generator 232 may be a pyrotechnic type gas generator or a stored gas type gas generator. When a signal is received from the controller by the gas generator 232 at an appropriate electrical input 234, the gas is released in the direction of the occupant. A pyrotechnic type gas generator may include an igniter for receiving the signal from the controller and starting the gas generating process. In the case of a stored gas inflator, the signal from the controller may cause the opening of a solenoid type valve or a rupture of a burst seal to release the stored gas. The gas generator 232 may include a separate disc shaped enclosure that includes ports or openings designed to direct or diffuse the gas in the desired direction. For example, when a disc shaped gas generator 232 is employed, a series of ports or openings may be provided on the top or bottom of the gas generator facing the occupant.

The diffuser or gas directing device may have any suitable configuration, such as, for example, a tubular fabric arrangement. The device may include other diffusers, and those described herein are not limiting.

The occupant protection system may also include one or more than sensors 110, such as, for example, to the monitor the location of the occupant. For example, the device may include a sensor that is configured to detect the location of the lower legs of the occupant, which may determine whether the device activates. If the legs are detected to be in a position deemed to be highly dangerous, the device may activate to move the legs to another location. If the legs are detected to be in a position deemed not to be highly dangerous, then the device may be configured to not activate.

Further by way of example, the occupant protection system may include a sensor for detecting the vertical acceleration of the vehicle. The sensor 100 provides a signal to the controller 120 that is indicative of the vertical acceleration of the vehicle. In turn, the controller 120 is configured to receive the signal from the sensor and activate the gas emitting device when the signal from the sensor is indicative of a condition where the vertical acceleration of the vehicle exceeds a predetermined threshold. The device may include other sensors, and those described herein are not limiting.

As described above, the occupant protection system may include a controller 120, or other electronic device, configured to control the activation of the gas emitting device 130. The controller 120 may also control and/or monitor the other electronic components, such as a sensor 110, when utilized. The control module 120 may further be in communication with other vehicle devices, such as those necessary to deploy other safety devices (e.g., shown in FIG. 5), for example.

Figure 2:
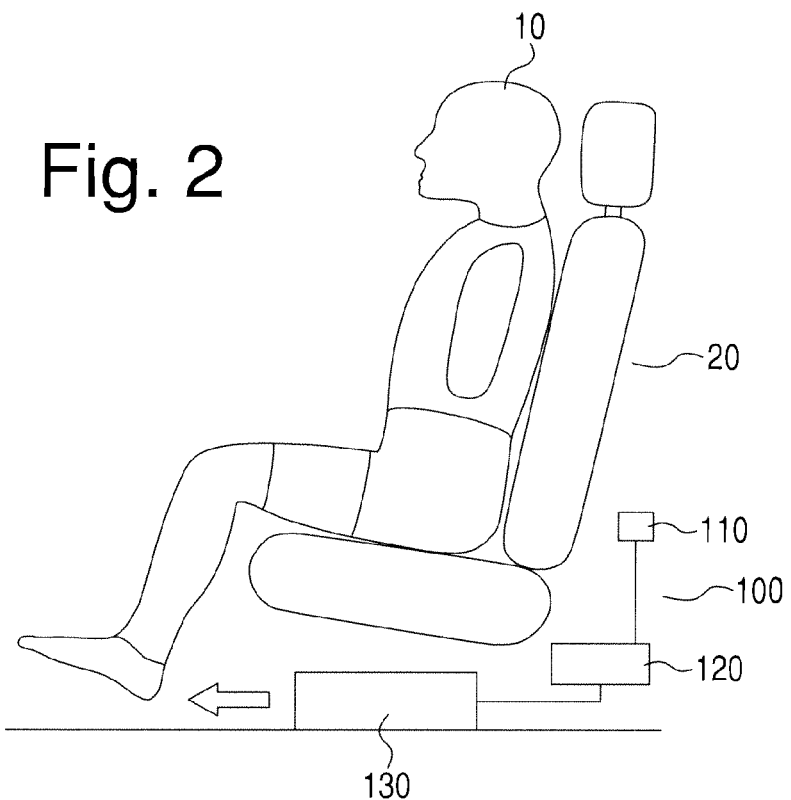
FIG. 2 is a side view of the interior of the vehicle of FIG. 1 with the system shown during the initial stage following activation.

FIG. 2 illustrates the occupant protection system in the initial stage following activation. During the initial stage following activation of the occupant protection system, the gas generated by the gas generator is directed from the gas emitting device 130 and is directed in a direction toward the portion (e.g., legs, arms) of the occupant. The gas has to bridge the gap disposed between the gas emitting device 130 and the portion of the occupant. The supersonic speed of the gas operates much faster to span the gap in a relatively shorter time, than the time for deployment of an airbag, for example.

As shown in FIG. 2, the emitted gas acts upon the portion (e.g., lower legs) of the occupant to move the legs in forward direction and to a safer location. The emitted gas is directed onto a portion (e.g., legs, arms) of the occupant thereby applying a pressure onto the portion to move the portion to a different (i.e., safer) location. As shown, the gas is configured to move the feet and lower legs of the occupant from a position proximate to the floor to a position that is elevated from the floor of the vehicle. This may advantageously protect the occupant when the vehicle experiences an external explosion underneath the vehicle, by moving the lower legs of the occupant farther away from the impact zone of the explosion (e.g., blast). Thus, the likelihood of injury of the occupant may be reduced by moving the portions of the occupant, which would otherwise be proximate to the explosion and in contact with the floor for of the vehicle, away from the explosion. Because the gas generated is travelling at such a relatively high speed (e.g., supersonic), the time from activation of the device to movement of the portion (e.g., legs) of the occupant is much shorter relative to other mechanical methods of moving the occupant. Furthermore, the pressure of the gas may be tailored to be effective in moving the occupant yet relatively gentle compared to other mechanical methods having a moving mass to move the occupant.

Figure 5:
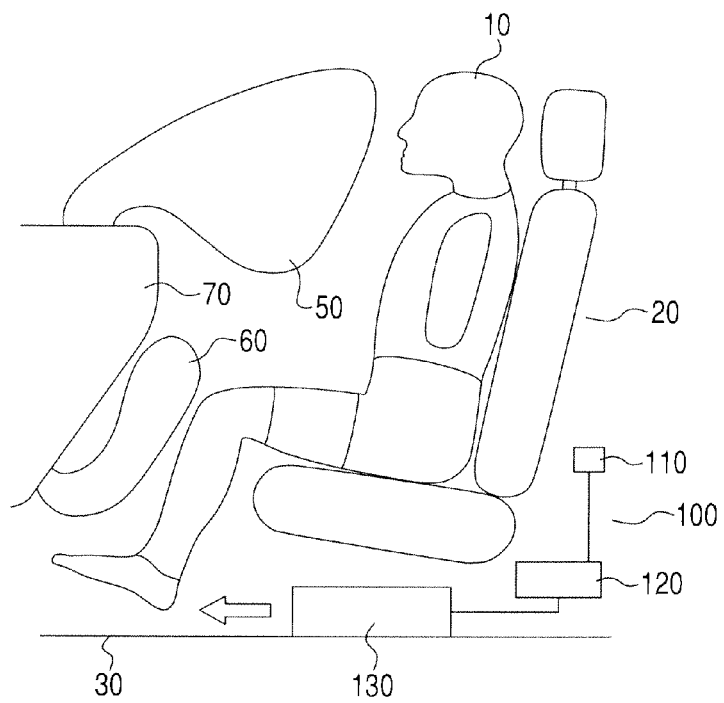
FIG. 5 is a side view of an interior of a vehicle showing an alternative embodiment of an occupant protection system.

As shown in FIG. 5, the occupant protection system may incorporate additional occupant protection devices. Such as, for example, airbags. FIG. 5 depicts a knee airbag 60 and a frontal airbag 50, which are configured to deploy from the instrument panel or dashboard 70 of the vehicle. The knee airbag 60 could function to absorb energy associated with the movement of the occupants limbs from the gas generated by the gas emitting device 130. However, additional airbags could be optionally included. For example, a roof deployed airbag could be deployed above the head of the occupant. Side airbags could be employed to protect the occupant from ejection or impacting the side of the vehicle. In addition, the system could include a seat belt system and/or the seat vertical height adjusting system disclosed in U.S. patent application Ser. No. 13/830,443 (incorporated by reference herein).

It should be noted that although the embodiments in FIGS. 1-5 show occupant protection systems configured to protect an occupant by causing movement of the legs of an occupant. However, the same systems may be used to direct movement of other parts of the occupant's body (e.g., arms or other portions). Accordingly, these systems may be configured in different locations in the vehicle, such as, for example, behind the seat system at a height that is adjacent to the arms. Thus, the embodiments shown in FIGS. 1-5 are not limiting.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the occupant protection systems as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A system for protecting an occupant positioned in a seat of a vehicle comprising:
   a gas emitting device positioned adjacent to an occupant of a vehicle;
   a controller configured to control the activation of the gas emitting device;
   wherein, when activated, the gas emitting device is configured to emit gas toward a portion of the occupant so that of the emitted gas impinges directly on and forces the portion of the occupant to move.

2. The system of claim 1, further comprising a sensor for detecting a vertical acceleration of the vehicle.

3. The system of claim 2, wherein the controller activates the gas emitting device when the vertical acceleration exceeds a predetermined threshold.

4. The system of claim 1, wherein the gas emitting device is located under the seat.

5. The system of claim 4, wherein the gas emitting device includes a gas directing device that directs the emitted gas toward the legs of the occupant.

6. The system of claim 1, wherein the gas emitting device includes a pyrotechnic gas generator.

7. The system of claim 1, wherein the gas emitting device includes stored gas.

8. A module for protecting the legs of an occupant positioned in a seat of a vehicle from an explosive force originating under a floor of the vehicle comprising;

a gas emitting device configured to emit gas in the direction of the vehicle occupant so that the legs of the occupant are forced to move by the emitted gas impinging directly on the legs;

wherein the module is positioned below the seat of the vehicle and includes a gas directing device configured to direct the emitted gas toward to the legs of the occupant.

9. The module of claim 8, wherein the gas emitting device includes a pyrotechnic gas generator.

10. The module of claim 8, wherein the gas emitting device includes stored gas.

11. The module of claim 8, wherein the gas emitting device is configured to be activated by a signal from a controller.

12. The module of claim 8, further comprising a housing for directing the emitted gas toward the legs of the occupant.

13. A system for protecting an occupant positioned in a seat of a vehicle comprising:

a gas emitting device positioned adjacent to an occupant of a vehicle;

a controller configured to control the activation of the gas emitting device;

a sensor configured to detect the vertical acceleration of the vehicle;

wherein the controller is configured to receive a signal from the sensor and activate the gas emitting device when the signal from the sensor is indicative of a condition where the vertical acceleration of the vehicle exceeds a predetermined threshold;

wherein, when activated, the gas emitting device is configured to emit gas toward the legs of the occupant so that the force of the emitted gas directly forces the legs of the occupant to move.

14. The system of claim 13, wherein the gas emitting device is mounted under the seat of the vehicle.

15. The system of claim 14, wherein the gas emitting device is mounted to the floor of the vehicle.

16. The system of claim 13, wherein the gas emitting device includes a pyrotechnic gas generator.

17. The system of claim 13, wherein the controller is configured to activate the gas generator by sending a signal to the gas generator.

* * * * *